United States Patent [19]

Clendinning et al.

[11] 3,867,324

[45] Feb. 18, 1975

[54] ENVIRONMENTALLY DEGRADABLE-BIODEGRADABLE BLEND OF AN OXYALKANOYL POLYMER AND AN ENVIRONMENTALLY DEGRADABLE ETHYLENE POLYMER

[75] Inventors: Robert A. Clendinning, New Providence; James E. Potts, Millington; Stephen W. Cornell, Dunellen, all of N.J.

[73] Assignee: Union Carbide Corporation, New York, N.Y.

[22] Filed: July 28, 1972

[21] Appl. No.: 275,971

[52] U.S. Cl............... 260/23 H, 47/9, 47/37, 260/45.95 R, 260/897, 260/DIG. 43
[51] Int. Cl............................................. C09f 29/12
[58] Field of Search ............ 47/37, 9; 260/DIG. 43, 260/897, 23 H, 45.9, 45.95 R

[56] References Cited
UNITED STATES PATENTS

| | | | |
|---|---|---|---|
| 3,454,510 | 7/1969 | Newland et al.................. | 260/23 |
| 3,534,120 | 10/1970 | Ando et al....................... | 260/897 |
| 3,592,877 | 7/1971 | Mullins........................... | 260/897 |
| 3,632,687 | 1/1972 | Walter et al..................... | 260/897 |
| 3,636,956 | 1/1972 | Schneider........................ | 260/78.3 |
| 3,676,401 | 7/1972 | Henry.............................. | 260/23 |
| 3,734,979 | 5/1973 | Koleske et al.................. | 260/897 |
| 3,767,638 | 10/1973 | Johnson........................... | 260/93.7 |

OTHER PUBLICATIONS

Polymer Preprints, vol. 13, No. 2, p. 629–634, Rec'd July 15, 1972, Potts et al.
Chem Tech, July 1971, p. 409–415, Rodriquez.
Applied Microbiology, Vol. 16, No. 6, p. 900–905, Darby et al., (1968).

*Primary Examiner*—Donald E. Czaja
*Assistant Examiner*—Eugene C. Rzucidlo
*Attorney, Agent, or Firm*—James J. O'Connel

[57] ABSTRACT

Novel polymeric blends which are capable of being fabricated into useful and novel consumer-type and industrial-type plastic products. After the useful life of such products they can be discarded. The ambient surrounding elements, including microorganisms and sunlight, thereafter cause the discarded products to degrade. The novel blends comprise a biodegradable thermoplastic polymer, e.g., poly(epsilon-caprolactone) or poly(ethylene adipate), and an environmentally degradable normally-solid ethylene polymer.

32 Claims, No Drawings

ENVIRONMENTALLY DEGRADABLE-BIODEGRADABLE BLEND OF AN OXYALKANOYL POLYMER AND AN ENVIRONMENTALLY DEGRADABLE ETHYLENE POLYMER

This invention relates to novel blends comprising a biodegradable thermoplastic polymer and an environmentally degradable ethylene polymer; to the novel shaped articles fabricated therefrom as exemplified by mulch film, transplanter containers, disposable containers, shipping boxes and crates, packaging material, can carriers, and the like; and to transplanter containers which possess a germination medium, and optionally, a seed or seedling in such medium.

The literal inundation of our lands in recent years with plastic and plastic-like packaging material and shipping containers in the form of discarded film, boxes, crates, wrappings, etc., has received wide attention during the last decade. One approach towards a partial solution to this plastic litter and disposal problem has been the incorporation of various additives into opaque polyolefin films to make them photodegradable. This approach, though of limited applicability, has been looked upon with favor from ecological-minded citizens who are aware of the current plastic litter problems.

In the seed and nursery industries and in the regeneration of forests, it is a common practice to plant seeds or seedlings in soil or conditioned material which is contained in relatively small containers, such as metal cans, clay pots, polystyrene containers, etc., so that initial growth may be carefully controlled under greenhouse or other desirable conditions. During such growth, the root system of the plant develops and becomes established within the soil or other material in the container. The use of metal, clay or other similar types of containers is generally satisfactory during the initial growth period. A major drawback of such containers is that the plant must be entirely removed from the container when it is to be transplanted to the field or to a larger container. Since the root system has developed within the soil or material in which growth was started, the roots are firmly embedded and intertwined with such soil and removal from the container of the plant and the soil in which the roots are established disturbs the root system and results in damage thereto. It would be advantageous, therefore, if such containers were fabricated from a mixture comprising an environmentally degradable substance(s) and a biodegradable substance(s) in which the container possesses the capability of maintaining its shape while undergoing at least partial environmental degradation during the initial growth period of a plant and, after transplanting the container and its contents to the field, by hand or mechanical means, it possesses the capability of undergoing biodegradation.

Accordingly, it is an object of this invention to provide novel blends comprising biodegradable thermoplastic polymers and environmentally degradable ethylene polymers. It is also an object of the invention to provide novel blends from materials comprising biodegradable and environmentally degradable substances, said blends having the capability of being fabricated into articles of commerce, e.g., boxes, crates, packing material, film, containers, and the like. Another object of the invention is to provide novel shaped articles in the form of film, disposable containers, transplanter containers, shipping containers, storage containers, packaging material, toys, and the like said articles having the capability of undergoing both biodegradation and environmental degradation. A further object is to provide an improved transplanter container fabricated from materials comprising biodegradable thermoplastic polymers and environmentally degradable thermoplastic ethylene polymers, said container being characterized by its ability to maintain its shape while undergoing at least partial environmental degradation during the initial growth period of a plant and, after transplating the container and its contents to the field, by hand or mechanical means, being characterized by its ability to undergo biodegradation. A particular object is to provide an improved transplanter container constructed of materials which has the property of holding its shape in a moist and/or humid environment. A yet further object of the invention is to provide a novel agricultural mulch from material comprising biodegradable thermoplastic polymer and environmentally degradable ethylene polymer. Another object of the invention is to provide improved methods utilizing biodegradable mulches and transplanter containers. Still another object of the invention is to provide a novel article of manufacture comprising a biodegradable-environmentally degradable thermoplastic container, a germination medium, and a seed or seedling therein. At least one of the aforesaid objects and other objects will become apparent to those skilled in the art in the light of the specification.

In one aspect the invention is directed to novel blends comprising biodegradable thermoplastic polymer and environmentally degradable ethylene polymer. Such blends are suitable for fabrication of opaque to transparent consumer-type and industrial-type plastic products. Once such products are discarded, the ambient surrounding elements cause them to degrade.

Strictly speaking, biodegradable materials are those which, because of their chemical structure are susceptible to being assimilated by microorganisms such as molds, fungi, and bacteria, when buried in the ground or otherwise contacted with the organisms under conditions conducive to their growth. Accordingly, the term "biodegradable", as used herein, is reserved for that type of degradability which is brought about by living organisms, usually microorganisms. On the other hand, the term "environmentally degradable ethylene polymer(s)", as used herein, refers to ethylene polymers which by virtue of additives or other material therein are capable of being degraded by the surroundings or environmental elements such as sunlight, rain, moisture, wind, temperature, and the like. Microorganisms are not included within this latter definition.

The biodegradable thermoplastic polymers which are suitable in the practice of the invention are the normally-solid oxyalkanoyl polymers and the normally-solid dialkanoyl polymers. Such polymers possess a reduced viscosity value of at least about 0.1 and upwards to about 12, and higher. In verious desirable embodiments biodegradable thermoplastic polymers which have a wide span of usefulness are those which possess a reduced viscosity value in the range of from about 0.2 to about 8.

The normally-solid thermoplastic dialkanoyl polymers are further characterized in that they contain at least about 10 weight percent, desirably greater than about 20 weight percent, of the recurring linear dialkanoyl-containing unit of the formula:

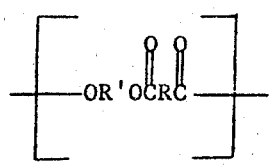

wherein R represents a divalent aliphatic hydrocarbon radical, desirably a $C_1$-$C_{12}$ alkylene and $C_2$-$C_{12}$ alkylidene, e.g., methylene, ethylene, propylene, tetramethylene, heptamethylene, octamethylene, decamethylene, ethylidene, propylidene, octylidene, etc; and wherein R' represents a divalent aliphatic hydrocarbon radical as described above or a divalent aliphatic oxahydrocarbon radical desirably of the formula —$C_2$-$C_{12}$-alkylene(oxy$C_2$-$C_{12}$alkylene)$_y$.

The normally-solid thermoplastic oxyalkanoyl polymers, on the other hand, are characterized in that they contain at least about 10 weight percent, desirably greater than about 20 weight percent, of the oxyalkanoyl unit,

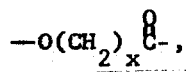

recurring therein, wherein $x$ is an integer having a value of 2, 3, and 5–7 preferably 5.

The aforesaid recurring oxyalkanoyl unit or recurring dialkanoyl unit is interconnected through the oxy group (—O—) of one unit with a carbonyl group

of a second unit. In other words, the interconnection of the oxyalkanoyl units or the dialkanoyl units does not involve the direct bonding of two carbonyl groups.

In addition to the apropos recurring unit, the biodegradable thermoplastic polymer may comprise other moieties or groups therein especially those which intersperse or terminate the polymeric chain thereof as illustrated by the

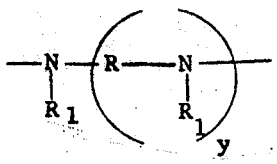

group; the urethane group

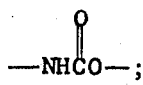

the

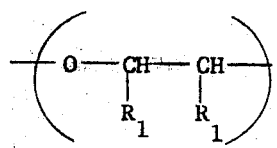

group; the

—NHCHN— group; the biuret group,

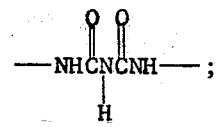

the divalent mono- and polyaromatic rings including fused and bridged rings; lower alkyl substituted oxyalkanoyl groups; catalyst residue; the carbonate group,

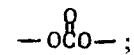

and others. In the above illustrated groups, $R_1$ desirably is hydrogen or methyl; $y$ represents an integer which has a value of at least one, e.g., from 1 to 4; and R has the aforesaid meaning.

As previously noted, the biodegradable thermoplastic polymers which are suitable in the practice of the invention are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the different between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other common organic solvent for the polymer may be used) at 30°C.

Though biodegradability of the normally-solid thermoplastic polymer, i.e., thermoplastic dialkanoyl polymer or thermoplastic oxyalkanoyl polymer, is oftentimes manifest when at least about 10 weight percent of its weight is attributable to dialkanoyl units, especially diadipoyl units, or oxyalkanoyl units, especially oxycaproyl units, or mixtures thereof, it is desirable that the novel blends, and articles of manufacture therefrom, comprise thermoplastic polymer in which at least about 20 weight percent of the weight of such polymer is in the form of the aforesaid units. In specific aspects of the invention, it is preferred that such polymer contain at least about 50 weight percent, and preferably still at least about 70 weight percent, and upwards to about 100 weight percent of such units therein.

The thermoplastic dialkanoyl polymers can be prepared by known methods. A general procedure for the preparation of poly(alkylene alkanedioate) glycols (or dicarboxy compounds) involves well-documented esterification techniques using predetermined amounts of an aliphatic diol and an alkanedioic acid. A molar excess of the diol results in dihydroxyl-terminated polymers whereas the use of a molar excess of the dicarboxylic acid gives dicarboxyl-terminated polymers. In general, the alkylene alkanedioate polymers are suitably obtained under reaction conditions of the order of 250°C., and higher, using low pressures, e.g., less than 1 mm. of Hg Water of condensation is removed from the reaction zone by conventional equipment suitable for such purposes. Illustrative of the aliphatic glycols which can be employed are ethylene glycol, diethylene glycol, propylene glycol, dipropylene glycol, 1,4-butanediol, 1,3-butylene glycol, 1,5-pentanediol, 1,6-hexanediol, 1,8-octanediol, 1,4-cyclohexanediol, 1,12-dodecanediol, and the like. Desirably, the aliphatic glycol contains from 2 to 8 carbon atoms. Illustrative alkanedioic acid reactants include malonic acid, succinic acid, glutaric acid, adipic acid, pimelic acid, suberic acid, azelaic acid, sebacic acid, dodecanedioic acid, and the like. Desirably, the alkanedioic acid contains from 2 to 12 carbon atoms. Mixtures of the aforesaid aliphatic glycols and/or alkanedioic acids can be employed. In addition, the reaction mixture can comprise small amounts of hydroxyalkanoic acid, vicinal-epoxy compounds, cyclic ethers, cyclic carbonates, etc., e.g., 6-hydroxycaproic acid, ethylene oxide, tetrahydrofuran, tetramethylene carbonate, and the like, as well as the glycol and diacid reactants. Higher molecular weight thermoplastic alkylene alkanedioate polymers can be prepared by following the teachings in the prior art, e.g., note U.S. Pat. Nos. 2,423,823 and 2,071,250. The polyesterification reaction, as typified above, is effected under extremely low pressure, e.g., less than about $10^{-3}$ mm. of Hg using equimolar quantities of diol and diacid.

The alkylene alkanedioate polymers which have number average molecular weights of, for example, less than about 25,000 can be characterized by hydroxyl end-groups or carboxyl end-groups. If desired, these polymers can be reacted with a diisocyanate, e.g., 1,6-hexamethylene diisocyanate, 2,4- and/or 2,6-tolylene diisocyanate, bis(4-isocyanatophenyl)methane, bis(4-isocyanatocyclohexyl)methane, etc., to extend the polymeric chain thereof, or such hydroxyl-terminated polymers or carboxyl-terminated polymers as well as their polyurethane extension products can be reacted with so-called "chain stoppers" such as a monocarboxylic acid or anhydride, or a monohydric compound such as an alkanol.

The thermoplastic oxyalkanoyl polymers can be prepared by various methods. A general procedure involves reacting a large molar excess of the appropriate lactone, e.g., epsilon-caprolactone, zeta-enantholactone, and/or eta-caprylolactone with an organic initiator which contains two active hydrogen groups, e.g., hydroxyl, carboxyl, primary amino, secondary amino, and mixtures thereof, such groups being capable of opening the lactone ring whereby it adds as a linear chain (of recurring oxyalkanoyl units) to the site of the active hydrogen-containing group, at an elevated temperature, preferably in the presence of a catalyst, and for a period of time sufficient to produce the desired polymers. By carefully controlling the purity and molar ratio of lactone reactant to organic initiator there can be produced "initiated" poly(oxyalkanoyl) polymers whose number average molecular weight can range from several hundred to about 100,000. Organic initiators which can be employed include primary diamines, secondary diamines, mixed primary-secondary diamines, aminoalcohols, diols, dicarboxylic acids, hydroxycarboxylic acids, aminocarboxylic acids, etc. Such organic initiators are voluminously illustrated in the literature, e.g., U.S. Pat. Nos. 3,169,945 and 3,427,346. Catalysts which can be employed include, for instance, stannous octanoate, tetrabutyltitanate, dibutyltin dilaurate, and the like. A temperature in the range of from about 150° to about 250°C for periods ranging upwards to about 24 hours, and longer, are suitable.

Thermoplastic oxycaproyl polymers can also be prepared by reacting the cyclic ester, e.g., epsiloncaprolactone, and/or the corresponding hydroxyacid e.g., 6-hydroxycaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. It is highly desirable that free diol or free dicarboxylic acid not be present at the termination of the polyesterification reaction. The water of esterification which results during the reaction can be removed via conventional techniques. The diols and dicarboxylic acids which are particularly suitable include those illustrated by the formulae HO$\{$R'O$\}_y$H and HOOCRCOOH such as ethylene glycol, propylene glycol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, subacic acid, phthalic acid, and the like.

In the absence of added organic initiator, the thermoplastic oxyalkanoyl polymers can be prepared by polymerizing a lactone reactant, e.g., beta-propiolactone, delta-valerolactone, epsilon-caprolactone, etc., in the presence of anionic catalysts such as di-n-butylzinc, tri-n-butylaluminum, diethylmagnesium, aluminum triisopropoxide n-butyllithium, dimethylcadmium, and the like. The reaction is desirably conducted at an elevated temperature, e.g., 100° to 250°C, for periods of time ranging from minutes to several hours, e.g., from about 10 minutes to about 24 hours. The reaction mixture can comprise, in addition to the lactone reactant, minor quantities of other polymerizable cyclic monomers such as tetramethylene carbonate, methyl-epsilon-caprolactone, keto-dioxane, etc. The number average molecular weight of the resulting polymeric products which are produced by this exemplified "non-initiated" method are, in general, quite high. For example, products which have number average molecular weights ranging from about 10,000 to several hundred thousands can be prepared. The patent literature, e.g., U.S. Pat. Nos. 3,021,309 to 3,021,317, discusses in detail the preparation of these polymers.

Thermoplastic oxyalkanoyl polymers can also be prepared by polymerizing an admixture of $C_7$-$C_9$ lactone, a vicinal epoxy compound, e.g., ethylene oxide, propylene oxide, butylene oxide, cyclohexene oxide, etc., and an interfacial agent such as a solid, relatively high molecular weight poly(vinyl) stearate) or lauryl methacrylate/vinyl chloride copolymer (reduced viscosity in cyclohexanone of from about 0.3 to about 1.0), in the presence of an inert normally-liquid saturated aliphatic hydrocarbon vehicle such as heptane, using phosphorus pentafluoride as the catalyst therefor, and in the absence of an active hydrogen-containing organic initiator, at an elevated temperature, e.g., about 80°C, and for a period of time sufficient to produce such polymers.

Thermoplastic oxyalkanoyl polymers can also be prepared by reacting a molar excess of a lactone with a polyoxyalkylene diol which has a molecular weight ranging from about 400 to about 20,000 under conditions discussed supra with reference to the initiated poly(oxyalkanoyl) polymers. Illustrative of the polyoxyalkylene diols which are contemplated include the poly(oxyethylene) diols, the poly(oxypropylene) diols, and the poly(oxyethyleneoxypropylene) diols. The resulting polymers can be considered, in effect, to be ABA block polymers in which the A portions represent a polyoxyalkanoyl segment or block and in which the B portion represents a polyoxyalkylene segment or block. The number average molecular weight of these ABA block polymers can range upwards to 50,000, and higher, depending on the molecular weight of the polyoxyalkylene diol reactant and the molar ratio of the lactone reactant to polyoxyalkylene diol reactant employed and consumed in the process. By using mono end-blocked polyalkylene diols such as the monoalkyl ether of polyoxyalkylene diol, the above discussed preparation results in polymers having an AB block configuration.

Thermoplastic oxyalkanoyl polymers which can be considered to be "graft" polymers can be prepared by the addition of $C_6$–$C_9$ lactone at the active hydrogen sites, e.g., hydroxyl or amino, which are pendant along the polymeric chain of so-called vinyl polymers. Such vinyl polymers may, for example, be obtained by the copolymerization of ethylene and vinyl acetate, followed by subsequent saponification of the acetate groups to yield polymers which are characterized by a plurality of pendant hydroxyl groups along the polymeric chain thereof. A wide host of ethylenically unsaturated monomers can be employed to prepare the vinyl polymers and include, for example, 2-hydroxyethyl acrylate, 2-hydroxyethyl methacrylate, styrene, acrylonitrile, propylene, vinyl chloride, and the like. The choice of the ethylenically unsaturated monomers is such that the resulting polymer contains a plurality of pendant hydroxyl groups, or groups which can be converted to hydroxyl groups. The addition of the $C_6$–$C_9$ lactone at the active hydrogen site will produce graft polymers of number average molecular weights upwards to approximately 100,000, and higher.

The oxyalkanoyl polymers which have number average molecular weights of, for example, less than 25,000 are characterized by functional end groups. For instance, hydroxyl-terminated polymers can be prepared from a diol initiator and epsilon-caprolactone using molar ratios of lactone to initiator upwards to about 100:1. If desired, these polymers may be reacted with a diisocyanate, e.g., 1,6-hexamethylene diisocyanate, 2,4- and/or 2,6-tolylene diisocyanate, bis (4-isocyanatophenyl)methane, bis(4-isocyanatocyclohexyl)methane, etc., to extend the polymeric chain, or such hydroxyl-terminated polymers as well as their polyurethane extension products can be reacted with so-called chain stoppers such as a monocarboxylic acid or anhydride.

The environmentally degradable ethylene polymers which are suitable as a component in the novel blends comprise a mixture of a polyvalent transition metal salt and a normally-solid thermoplastic ethylene polymer. In highly suitable embodiments of the invention it has been observed that the combination of both an auto-oxidative susceptible organic additive described hereinafter plur a polyvalent transition metal salt in said thermoplastic ethylene polymer yields an environmentally degradable ethylene polymer which will undergo weathering or environmental degradation at a greater rate than a similar ethylene polymeric composition which contains an equivalent or greater amount of only the auto-oxidative susceptible organic additive or only the polyvalent transition metal salt. An environmentally degradable ethylene polymer which contains an antioxidant as well as the aforesaid metal salt with/without the aforesaid auto-oxidative additive in combination with the ethylene polymer per se represents a highly suitable component of the novel blend. The environmentally degradable ethylene polymers can also contain conventional additives including fillers, pigments, slip agents, antistats, antiblocks, antifogs, and other materials which are quite often added to conventional ethylene polymers.

In the practice of suitable embodiments of the invention the proportions of the major components, i.e., biodegradable thermoplastic polymer and environmentally degradable ethylene polymer, can be adjusted so that novel articles of manufacture having "tailor-made" characteristics can be fabricated therefrom. Such articles, during use and after use, are capable of undergoing varying degrees or levels of multi-faceted crazing and cracking and biodegradability when exposed to the environmental elements and to microorganisms. Photodegradation of such articles occurs at a significantly faster rate after exposure thereof to natural or artificial actinic light.

The normally-solid thermoplastic ethylene polymer per se represents the major component of the environmentally degradable ethylene polymer. The ethylene polymer can be an ethylene homopolymer or copolymer, or mixture of either or both. The ethylene polymers which are contemplated include those prepared via the polymerization of ethylene, alone, or in admixture with any ethylenically unsaturated monomer, e.g., monomers having the group

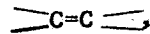

which will copolymerize with ethylene to form normally-solid thermoplastic ethylene copolymers. Illustrative of copolymerizable monomers include the alpha olefins such as propylene, 1-butene, isobutene, 1-pentene, and 1-octene; the halogenated olefins such as chloroprene, tetrafluoroethylene, chlorotrifluoroethylene, and hexafluoropropylene; the vinyl benzenes and naphthalenes such as styrene, o-methoxystyrene, p-methoxystyrene, m-methoxystyrene, o-methylstyrene, o-phenylstyrene, vinylnaphthalene, and the like; the vinyl and vinylidene halides such as vinyl chloride, vinyl fluoride, vinylidene chloride, vinylidene fluoride, vinylidene bromide, and the like; the vinyl esters such as vinyl formate, vinyl acetate, vinyl propionate, vinyl butyrate, vinyl benzoate, and the like; the acrylic and alpha-alkyl acrylic acids, and the esters, amides and nitriles thereof, such as acrylic acid, chloroacrylic acid, methacrylic acid, methyl acrylate, ethyl acrylate, butyl acrylate, n-octyl acrylate, 2-ethylhexyl acrylate, methyl methacrylate, butyl methacrylate, acrylamide, N-methylacrylamide, N,N-dimethylacrylamide, N,N-dimethylmethacrylamide, acrylonitrile, methacrylonitrile, and the like; the maleic and fumaric acids their anhydrides, and their alkyl esters such as maleic anhydride, dimethyl maleate, and the like; the vinyl alkyl ethers and ketones such as vinyl methyl ether, vinyl ethyl ether, vinyl isobutyl ether, methyl vinyl ketone, ethyl vinyl ketone, and isobutyl vinyl ketone; dienes such as butadiene, isoprene, cyclopentadiene, hexadiene-1,6, norbornadiene, and dicyclopentadiene; vinylpyridine; N-vinylcarbazole; N-vinylpyrrolidine; acrolein; vinyl alcohol; vinyl acetal; vinyl butyral; and the like. Other monomers which may be interpolymerized with ethylene include, carbon monoxide and formaldehyde, but these are generally not preferred.

In general, the ethylene copolymers per se contain a major amount of ethylene units polymerized in the copolymer. Desirably the copolymer contains at least about 50 weight percent polymerized ethylene monomer, and preferably from about 80 to about 99 weight percent polymerized ethylene monomer. The remainder of the ethylene copolymers comprises other ethylenically unsaturated monomers polymerized therein.

Preferred normally-solid thermoplastic ethylene polymers include the high and low density polyethylenes; the ethylene/alkyl 2-alkenoate copolymers such as ethylene/ethyl acrylate copolymer, ethylene/ethyl methacrylate copolymer, etc.; the ethylene/vinyl alkanoate copolymers such as ethyl/vinyl acetate; ethylene/propylene/ethylidenenorbornene copolymer; ethylene/styrene copolymer; and the like.

The polyvalent transition metal salt contained in the environmentally degradable ethylene polymer can be an inorganic or organic salt of a polyvalent transition metal. The organic salts of a polyvalent transition metal wherein said metals are those in which electron transfer occurs in the 3d sub-shell or the 4f sub-shell are most preferred. The transition metals referred to are as defined in the Periodic Chart at the terminal leaf page of the Handbook of Chemistry and Physics, the Chemical Rubber Co., 49th edition, (1968–69). These metals represent those elements in the Fourth Period having atomic numbers of 21 to 30, in the Fifth Period having atomic numbers of 39 to 48, and in the Sixth Period having atomic numbers of 57 to 71. Among the specific transition metals wherein electron transfer occurs in the 3d sub-shell, one can mention by way of illustrations, V, Cr, Mn, Fe, Co, Ni, Cu, Zn, Zr, and Ag of the Fourth and Fifth Periods; among the transition metals wherein electron transfer occurs in the 4f sub-shell are Ce or Pr in the Sixth Period.

Illustrative inorganic and organic polyvalent transition metal salts include iron chloride, zinc chloride, mercurous chloride, chromium trichloride, copper nitrate, copper sulfate, cobalt chloride, nickel sulfate, iron sulfate, iron bromide, zinc sulfate, mercuric sulfate, cobalt acetate, cobalt octoate, cobalt naphthenate, iron naphthenate, iron octoate, lead stearate, lead octoate, zirconium stearate, cesium octoate, manganous stearate, manganous oleate, manganous dodecylacetoacetate, cobalt acetylacetonate, cobaltous acetate, cobaltous oleate, cobaltous stearate, cupric stearate, cupric oleate, ferric acetate, zinc octoate, zinc naphthenate, ferrous distearate, potassium permanganate, potassium trioxalatocobaltate (III), trisethylenediaminecobalt (III) chloride, sodium hexanitrocobaltate (III), potassium hexacyanocobaltate (III), and the like.

Desirably the polyvalent transition metal salt is a metal octanoate, metal naphthenate, metal acetate, metal stearate, or metal acetylacetonate. Mixtures of metal salts can, of course, be employed. It has been found that certain combinations of polyvalent transition metal salts promote degradation more so than the equivalent amount of any one salt of the combination. This is particularly noticeable with mixtures of iron and cobalt salts.

In desirable embodiments, the environmentally degradable ethylene polymer can include an auto-oxidative susceptible organic additive which can be either a polymer wherein the predominance of the units have, or a low molecular weight organic compound that has, at least one hydrogen bonded to a carbon atom having an auto-oxidative susceptibility greater than that of a hydrogen bonded to a normal secondary carbon atom. Thus, polypropylene which has hydrogen atoms bonded to tertiary carbon atoms that are more readily oxidizable than the hydrogen atoms that are bonded to the normal secondary carbon atoms of, for example, polyethylene, is a suitable auto-oxidative susceptible additive in polymer form. Illustrative of other readily auto-oxidative hydrogen atoms bonded to carbon atoms are the hydrogen atoms found, for example, in the allylic, benzylic, tertiary aliphatic, aldehydo, alpha-oxyhydrocarbyl or alpha-halohydrocarbyl groups.

Among the auto-oxidative susceptible polymers one can include the alpha-olefin polymers which are normally solid at room temperature and contain the unit

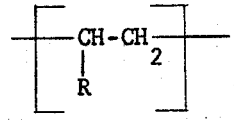

wherein R is an alkyl group. Illustrative of such alpha olefin polymers are polypropylene, poly(butene-1), poly(pentene-1), poly(4-methylpentene-1), poly(hexene-1), poly(octene-1), poly(octadecene-1), and the like. Other suitable auto-oxidative susceptible additives include the ethylene oxide homopolymers, the propylene oxide homopolymers, as well as the copolymers of ethylene oxide, of propylene oxide, and the like.

Among the suitable auto-oxidative susceptible additives which are of relatively low molecular weight include those which do not exceed about 5,000 in average molecular weight. For example, derivatives of aliphatic and cycloaliphatic compounds containing one or more allylic hydrogens such as ocimene, limonene (dipentene), cyclohexadiene, dicyclopentadiene, decahydronaphthalene, indene, tetrahydroindene, and the like; the unsaturated fatty acids such as linolenic acid, linoleic acid, oleic acid, crotonic and sorbic acid, as well as adducts of these and other unsaturated aliphatic and alicyclic compounds with such as maleic acid, acrylic acid, acrolein, and the like; compounds with highly reactive benzylic hydrogens such as cumene, para-isopropylbenzoic acid, and the like.

The preferred auto-oxidative susceptible organic additive is polypropylene, atactic or isotactic, crystalline or amorphous. Environmentally degradable ethylene polymers containing polypropylene as the auto-oxidative additive are desirable since such polymers tend to undergo high levels of crazing.

Antioxidants have been found to be useful in stabilizing the environmentally degradable ethylene polymers. Such "stabilized" polymers are highly desirable as the environmentally degradable component in the novel blends especially when the useful life period, i.e., the period prior to embrittlement and crazing, of such blends and articles therefrom is known. Thus, armed with this knowledge one can prepare novel blends and novel articles therefrom which are stable during the known useful life period simply by formulating such blends with an environmentally degradable ethylene polymer which has predetermined amounts of antioxidants and other additives therein. Upon exposure to the elements novel articles of manufacture from said blends are capable of undergoing embrittlement within a given period of time.

Illustrative antioxidants include the sterically hindered phenols, the arylamines, the thioureas, the thiocarbamates, the thioether esters, and the phosphites or mixtures or adducts thereof. Specific examples are tetrakis[methylene-3-(3',5'-di-tert-butyl-4'-hydroxyphenyl)propionate]methane, stearyl 3-(3',5'-di-tert-butyl-4'-hydroxyphenyl)propionate, distearyl 3,5-di-tert-butyl-4-hydroxybenzyl phosphite, 1,1,3-tris-(5'-tert-butyl-4'-hydroxy-2'-methylphenyl)butane, 4-methyl-1,-6-di(2'-hydroxy-3'-tert-butyl-5'-methylbenzyl)phenol, 2,4-di(3'-5'-di-tert-butyl-4'-hydroxyphenoxy)triazine, 2,2'-thiobis-(4'-methyl-6'-tert-butylphenol), 4,4'-thiobis(3-methyl-6-tert-butylphenol, 3,5-di-tert-butyl-4-hydroxyanisole, 2,6-di-tert-butyl-p-cresol, N-phenyl-beta-naphthylamine, N,N'-diphenyl-p-phenylenediamine, 2-ethylhexyldiphenylamine, N,N'-di-beta-naphthyl-p-phenylenediamine, N,N'-di-(2-octyl)-p-phenylenediamine, N,N'-di-3(5-methylheptyl)-p-phenylenediamine, 4,4'-dioctyldiphenylamine, 4-octyldiphenylamine, 4-t-butoxydiphenylamine, trimethylthiourea, 1,3-diethylthiourea, ethylene thiourea, sodium dibutyldithiocarbamate, dilauryl thiodipropionate, distearyl thiodipropionate, the mono-, di- and tri-nonylphenyl phosphites, and the like.

Other suitable antioxidants include dibutyl-para-cresol; p-cresol-formaldehyde resins; para-tertiary-alkylphenol formaldehyde resins in admixture with amino dithioformates; aliphatic polyepoxides; para-tertiary alkylphenol formaldehyde resins in admixture with mercapto compounds; carboxylic acids such as succinic acid, and the like; substituted oxamides such as oxanalide and the like; amino acids such as glycine and the like; aminopolycarboxylic acids such as ethylenediaminetetraacetic acid, diethylenetriaminepentaacetic acid, hydroxyethylethylenediaminetriacetic acid, nitrilotriacetic acid, hydroxyethyliminodiacetic acid, diaminocyclohexanetetraacetic acid, diaminoethyl ether tetraacetic acid; pentaerythritol; sorbitol; resorcinol; and the like.

The concentration of the components comprising the environmentally degradable ethylene polymer can vary over a wide range. The ethylene polymer per se, e.g., polyethylene, constitutes the major component and is normally present at a concentration of from at least about 70 percent by weight, the remainder being the other additives thereof. Preferably the ethylene polymer per se is present at a concentration of from about 90 to about 99 weight percent, based on the weight of the environmentally degradable ethylene polymer. The polyvalent transition metal salts are normally present in amounts from about 0.002 to about 2.0 weight percent of metal atom, based on the weight of the environmentally degradable ethylene polymer. Desirably, the metal is present in amounts of from about 0.005 to about 1.0 and preferably in amounts of from about 0.01 to about 0.1 weight percent. The auto-oxidative susceptible additives, if employed, are normally present at concentrations of from about 0.01 to about 40 weight percent, based on the weight of the environmentally degradable polymer. Desirably the auto-oxidative susceptible additive is present in amounts of from 0.05 to about 20 percent and preferably in amounts of from 0.1 to about 10 percent by weight. Desirably an antioxidant is employed in quantities sufficient to stabilize the novel articles of manufacture against oxidative degradation during fabrication of the same and during their useful life period. In general, the amount of antioxidant can range from about 0.0025 to about 1 weight percent, and higher, preferably from about 0.025 to about 0.1 weight percent, based on the weight of the environmentally degradable ethylene polymer.

The selected weight percentage of components, e.g., polyvalent transition metal salt and optionally antioxidant and/or auto-oxidative susceptible additive, etc., combined in the ethylene polymer per se can vary, as noted above, over a wide range. The optimum compositions of all the components which form what we have termed throughout this specification as environmentally degradable ethylene polymer will depend, to a significant extent, on the desired rate of environmental degradation, molecular weight of the various components, relative activity of the various components, the nature of the novel article of manufacture and the contemplated useful life span, and the like.

The environmentally degradable ethylene polymers can be compounded according to any one of several known techniques such as direct addition of all the components, master batching wherein any single master batch may contain several components but will not contain both the polyvalent transition metal compound and the auto-oxidation susceptible organic additive, or any other compounding procedure.

The production of environmentally degradable ethylene polymers by direct addition of all components and blending until a single homogeneous mixture is obtained are well known techniques. The master batching involves the preparation of two or more "packages" or compositions which are subsequently combined into a single homogeneous mixture. In the master batching procedure, the polyvalent transition metal compound and the auto-oxidative susceptible additive are initially present in separate master batch compositions. These separate master batch compositions are then combined or blended in proper proportions to produce the environmentally degradable ethylene polymers.

Broadly, the novel blends of the invention comprise from about 5 to about 95 weight percent of biodegradable thermoplastic polymer and from about 95 to about 5 weight percent of environmentally degradable ethylene polymer based on the total weight of the blend. In various desirable embodiments the novel blends comprise from about 10 to 90 weight percent, suitably from about 25 to about 75 weight percent, of biodegradable thermoplastic polymer; and from about 10 to about 90 weight percent, suitably from about 25 to about 75 weight percent, of environmentally degradable ethylene polymer; based on the total weight of the blend.

In addition to the biodegradable thermoplastic polymer and the environmentally degradable ethylene polymer, the novel blends can comprise other ingredients therein such as various plastic additives, e.g., the polyimides, the polyureas, the polyurethanes, the polyureides, the polyanhydrides, the polyethers, the polylactams, the polycarbonates, the nitrile rubber gum stocks, the polybutadiene rubber gumstocks, the styrene/butadiene rubber gumstocks, the phenolic resins, the epoxy resins, the melamine resins, the aminoplasts, and the like; fibrous and non-fibrous fillers, e.g., kaolin, bentonite, iron oxide, clay, carbon black, lamp black, silica, titanium dioxide, asbestos, vermiculite, metallic powders, calcium carbonate, calcium sulfate, powdered glass, mica, and the like; naturally occurring biodegradable products, e.g., sugar cane residue, sugar beet residue, peat moss, sawdust, hemp, sisal, linen, corn starch, cotton, rice hulls, wheat bran, soybean meal, potato starch, corn syrup, rice flour, gelatin, barley flour, rye flour, granulated sugar, wheat flour, wood chips, brewers yeast, vegetable gum, egg albumin, cardboard, disintegrated or shredded tree bark, and the like; plasticizers; dyes; plant nutrients; fertilizer; insecticides; pesticides; herbicides; and the like. The above-illustrated ingredients can comprise a minor portion of the weight of the novel blend, e.g., such ingredients can comprise up to about 50 weight percent of the novel blend.

Suitable equipment for fluxing the novel blends include Banbury mixers, screw extruders, two-roll or multi-roll mills, ribbon or paddle blendors, calenders, and the like. The time of blending or fluxing is not narrowly critical. The blending time should be sufficient to obtain a substantially uniform mixture.

In various aspects of the invention the novel blends are useful in the preparation of novel degradable articles of manufacture such as mulch film, disposable containers, shipping containers, storage containers, packaging material, transplanter containers, and the like. Well-known techniques in the art can be used to fabricate these novel articles and they include, for instance, compression molding, injection molding, transfer molding, extrusion, vacuum forming, blow molding, calendering, rotational molding, coating, dipping, and the like.

Novel articles of manufacture which have tailor-made or "build-in" properties or characteristics can be fabricated from the novel blends. For example, transplanter containers and mulch film fabricated from mixtures comprising environmentally degradable ethylene polymer, biodegradable thermoplastic polymer, and water-soluble polymer, e.g., wax-like and solid water-soluble ethylene oxide homopolymers and copolymers, have the ability to undergo relatively slow dissolution or leaching in an aqueous or humid surrounding to thus provide a more favorable environment for growth of fungi. Preliminary irradiation of the environmentally degradable ethylene polymer component, or of the novel blend, will measurably enhance the rate of environmental degradation. Normally a level of ionizing radiation used to accelerate degradation can be from about 1 to about 20 megareps (MGRPS). Greater or lesser dosages of radiation may be employed depending upon the particular desired rate of degradation. Such sources include the van de Graaff accelerator, cobalt 60, and the like. Other suitable modes of irradiation are, by way of example, ultra-violet lamp, sunlamp, swirl-flow plasma arc, mercury lamp, and the like. Any known radiation source can be used.

In the practice of various embodiments of the invention it is desirable that the novel articles of manufacture possess mechanical properties and characteristics which are suitable for the application contemplated. For instance, if the novel articles are to be used in mechanical transplantation methods or as shipping containers, e.g., boxes, crates, etc., it is highly desirable that such articles have sufficient strength properties to withstand breakdown or failure during use. By way of illustration, one can use, if desired, transplanter containers which are characterized by a modulus range of from about 10,000 psi, and lower, to about 1,000,000 psi (as determined by ASTM Method D-638). On the other hand, containers characterized by a much lower modulus can be tolerated in hand planting techniques, e.g., at least about 300 psi. It is to be understood that the aforementioned values are merely illustrative and that higher and lower values are contemplated as being within the scope of the invention.

One aspect of the invention is directed to novel transplanter containers, fabricated from the novel blends, and optionally, a germination medium in said containers with/without a seed or seedling in such medium. The container can be of any size and shape capable of having utility in horticultural, silvicultural, and agricultural applications. It can be in the form of a flower pot, cone, bullet, tube, cylinder, tray, etc. It should be capable of holding the germination medium therein. In this connection additional support or reinforcement material can be used. For instance, a container shaped in the form of a hollowed tube, opened at both extremities, may not be suitable in holding the germination medium in its interior. This drawback can be overcomed by stoppering one end of such tube with suitable plugging means, if necessary. The germination medium can be any mixture suitable for growing plant life such as farm products, flowers, shrubs, trees, grass, etc. The germination medium can be formed from synthetic materials, substances found in nature, or mixtures of both. A desirable germination medium comprises soil formed from disintegrated and decomposed rocks and minerals generally mixed with organic matter in various stages of decay, and having substantial porosity or pore space. The pore space will vary with the texture of the soil. The soil may comprise silt, sand, clay, stone, gravel, minerals, organic matter, etc. Conditioners and stabilizers can be added to or contained in soil and they include, for example, gypsum, calcium chloride, limestone, vermiculite, iron sulfate, water-soluble high molecular weight polymeric electrolytes, and others. Nutrients can be added to the soil to aid plant growth and to supplement the plant-food content thereof. The more important ones include the compounds of nitrogen, phosphorous, and potassium. Trace elements such as magnesium, iron, zinc, copper, etc., have been shown to be beneficial to plant growth and can be added to the soil. Various types of fertilizers provide useful nutrients. They can range from inorganic compounds as illustrated by ammonium nitrate types to organic compounds such as the long lasting urea forms which release the nitrogen slowly.

Any type of seed or seedling capable of growing in soil is contemplated. Of special interest are tree seeds and seedlings as illustrated by the deciduous and coniferous types such as oak, ash, maple, elm, Douglas Fir, pine, spruce, cedar, etc., shrub seedlings as illustrated by ornamental or evergreen types such as taxus, holly, juniper, etc.; plants and flowers of the various well-known varieties; and the like.

By the terms biodegradable and "biodegradability", as used herein, are meant that the novel blends and articles therefrom are capable of being cconsumed by microorganisms as, for example, bacteria or fungi, in an environment suitable to the growth of microorganisms such that there results a weight loss of at least approximately 20 weight percent in the biodegradable thermoplastic polymer component in such blend or article within a period of about 4 years, and generally within about 2 years. The degree and rate of biodegradability depend, to a significant extent, on the weight percent content of the oxyalkanoyl and/or dialkanoyl units contained in the thermoplastic biodegradable polymer.

In the following illustrative examples the processing and analytical methods used for preparation of the environmentally degradable ethylene polymer samples are as described immediately hereinbelow. Two compounding methods were employed. The first and primary method of sample compounding is by employing the two roll mill (hereinafter called "roll mill method"). The second method employed a Banbury mixer (hereinafter called "mixer method").

A 6 × 12 inches two-roll mill with heat supplied by full steam at 190°C. and heated for at least 15 minutes is used. With the bite as close as possible the ethylene polymer per se is added and then during a period of about 1 minute the bite is opened after the ethylene polymer per se has begun to flux. The polypropylene or other autooxidative susceptible agent is added (if applicable). Antioxidant and other filler (if applicable) are then added. The polyvalent transition metal salt is then slowly added in about 30 seconds. The material is worked for 2 minutes until homogeneous, then pulled off the rolls and cut into squares about 2 by 2 inch. It is recognized that any of the other conventional additives usually present such as pigment, slip agents, antiblock agents, etc., cab be present, if desired. Unless otherwise stated this method was used in the examples.

In the mixer method, a 5 lb. Banbury mixer was employed with full steam on the shell and rotors for 5 minutes to achieve 190°C. The ethylene polymer per se and auto-oxidative susceptible agent, if applicable, were added. The ram was moved downward at the full pressure of 80 psi and the Banbury operated at maximum forward speed for 3 minutes or until the materials are fluxed. The antioxidant and filler (if applicable), and polyvalent transition metal salt were added with the ram backed down to 10 psi and the Banbury at its slowest forward speed for 1 minute. The ram pressure was then readjusted to 80 psi and the Banbury was then operated at full forward speed for 2 minutes. Cooling water was then supplied to the shell and rotors and the mixer was operated at its slowest forward speed for 1 minute. Thereafter the compounded polymer was discharged, sheeted and diced.

After compounding by either the mixer or roll mill method the environmentally degradable ethylene polymer samples were compression molded by the following method. A mold lined with Mylar sheet was charged with environmentally degradable ethylene polymer. It was placed between preheated (190°C.) plattens and low pressure (1 ton on 6 inch$^2$ ram) was applied for 4 minutes followed by full pressure (32 tons on 6 inch$^2$ ram) for 2 minutes. The plattens were then water cooled and the sample was recovered.

Weathering tests were conducted by placing a plurality of identical specimens from the same molded sheet in an Atlas XW Weatherometer that uses a carbon arc radiation source with Corex D filters to simulate solar light spectral distribution. The sample was maintained at a blackbody radiation temperature of 140°C. over a 4 hour period, which included an 18 minute period of water spray. Water was permitted to accumulate at the bottom of the chamber to provide a humidified condition. The exposed samples are removed from the Weatherometer after certain periods of time and examined for embrittlement, % elongation, and FMIR. The period in hours that has transpired is recorded when the sample fails the test. Normally the samples are rated at the end of 20, 60, 100, 150, 200, 250, 350, 500, 750 and 1,000 hours of exposure. The specimen from the previous rating period is removed permanently from the Weatherometer at the end of the 60, 150, 250, 500 and 1,000 hours periods for complete evaluation. By this is meant that at the 20 hour period the first specimen is removed, rated and returned; at the 60 hour period it is permanently removed, rated and tested; at the 100 hour period the second specimen is removed, rated and returned; at the 150 hour period it is permanently removed, rated and tested. This procedure is continued in the time pairs until all of the specimens have been consumed and permanently removed. On occasion additional specimens were permanently removed, rated and tested at the 20 or 100 hour periods.

The permanently removed weathered samples were examined by surface reflectance infrared spectroscopy, known in the art as frustrated multiple internal reflection (FMIR), to examine buildup of the surface carbonyl layer due to weathering exposure. A Wilks Model-9D FMIR attachment on a Perkin-Elmer Model 21 infrared spectrophotometer was used to make the ratio measurements, hereinafter referred to also as R. A measure of the surface carbonyl buildup relative to methylene is calculated by the equation $R = A5.8/A7.3$; i.e., the absorbance of the carbonyl peak at 5.8 microns to the absorbance of the methylene peak at 7.3 microns. This is usually performed on a specimen that has been exposed and on specimens after 60 and 150 hours exposure; on occasion specimens were analyzed after exposures of 20 hours, 40 hours, 80 hours or 100 hours. The ratio R rarely exceeds 1.0 for weathered conventional polyethylene (which is still flexible). Embrittled polyethylene will have R values exceeding 1.0. An R value of 1.7 may be correlated with the onset of embrittlement. R values of 1.9 to 2.2 are characteristic of a fully developed surface carbonyl layer. R values above 2.5 are due principally to diminishing of the methylene peak, rather than to an increase in surface carbonyl level. The impact of a fully developed surface carbonyl layer is recognized to be that (1) oxidation of the bulk of the specimen is proceeding and (2) fracture prone sites exist on the specimen surface. Cracks initiated in the oxidized surface layer propagate through the less oxidized material in the interior of the polymer resulting in deterioration thereof.

The tensile physical properties of the weathered samples, tensile modulus, tensile strength, and ultimate elongation were measured by a modified ASTM D882-67 (Method A) procedure using an Instron Tensile Tester after 0, 60, 150, 250 and 500 hours exposure, and occasionally after 20 hours or 100 hours of exposure. In this modification a one inch specimen is used and stretched at a rate of 0.2 inch per minute to a one percent stretch to obtain the modulus; the same specimen is then stretched at a rate of 2 inches per minute to obtain the stress-strain curve. Elongation deterioration correlates with the embrittlement observed in the aforesaid Atlas XW Weatherometer ratings. Normally an ultimate elongation value less than 50% is slightly brittle and a value below 20% is brittle.

It was observed that as weathering exposure proceeds, surface cracking appeared. The cracks occur in environmentally degradable polyethylene compositions generally after the onset of embrittlement, usually between 150 to 250 hours of exposure. Through the optical microscope, the crack patterns which appeared on the surface of severely oxidized samples were clearly visible. The cross section fracture surfaces of brittle specimens were observed through the optical microscope and at magnifications of 46 × to 300 × it was possible to determine which areas of the cross section were brittle. Scanning electron micrographs of the weathered specimen at a magnification of 500 × show that the cracks were formed by brittle failure resulting in very sharp clean cuts. Primary cracks are normal to the surface and are believed to be influenced by the internal stress distribution in the specimen, and will be parallel to the surface if the stress distribution in the specimen is uniform. Secondary cracks join the primary cracks, are ess-shaped, and slant inward at an angle less than 90° to the surface. Tertiary cracks join primary and secondary ones and also are ess-shaped and likewise slant inwardly. This produces a network of cracks in which the spacing between the cracks progressively becomes smaller and results in particles on the order of 350 microns in width which can readily peel off or slough off due to the "slant faults" similar to that mechanism observed in exfoliating rocks.

The stability of the samples prior to weathering was determined by Differential Scanning Calorimetry (DSC). A du Pont 900 Thermal Analyzer with DSC module attachment and an external strip chart recorder were used for the isothermal DSC induction time studies. By measuring the length of time at 180° or 200°C. required for the heat of oxidation to be evolved, the stability of the specimen can be determined. At 200°C. well-stabilized commercial polyethylene has a 3 to 6 minute induction time. All induction times are given in minutes unless otherwise specified.

The DSC induction time measurements were made as follows: Test batches of environmentally degradable ethylene polymers were prepared on a two roll mill on which were blended 100 gram batches of ethylene polymer per se and additives. Minimum fluxing temperatures were used to avoid premature oxidation effects. The fluxed mixtures were then pressed into plaques about 10 × 10 inches with a thickness of 10 mils on a heated hydraulic press. Circular specimens 0.20 inch in diameter were cut from the 10 mils plaques and then placed in aluminum sample holders of the Differential Scanning Calorimeter (DSC) cell. In each case the sample holder plus sample were then placed on the raised sample position while an empty aluminum sample holder was placed on the raised reference position. Nitrogen was passed through the assembled DSC cell at a gas flow rate of 500 ml./min. blanketing the sample and reference cells with an inert atmosphere. The sample and reference cells were then heated at a programmed rate of 80°C. per minute to a preselected isothermal temperature. When equilibrium temperature was obtained, an accurate millivolt recorder (with a 1 inch per minute linear chart speed and a 0 to 25 millivolts chart span) began to record the amplified differential thermocouple signal from the DSC cell. After 1 inch of chart travel the nitrogen flow was rapidly stopped and air was passed through the DSC cell, also at a flow rate of 500 ml per minute. The sharp inflection in the exothermic direction of the recorded curve indicated the end of the induction period. Since the induction time is that period of time during which there is no exotherm or thermal oxidative degradation, it is a measure of the effectiveness of thermal stabilizing additives which have been compounded with the ethylene polymers. A direct comparison between controls and the environmentally degradable ethylene polymers is therefore provided by this induction time measurement.

Unless indicated to the contrary, all "percents" are by weight. Also, numerical references as in a copolymer of 67 ethylene/33 vinyl acetate refers to 67 parts by weight of ethylene and 33 parts by weight of vinyl acetate chemically combined therein.

EXAMPLE 1

Samples comprised of (i) low density polyethylene LDPE (0.922 density), (ii) polypropylene PP (98% isotactic) as a polymeric auto-oxidative susceptible additive in amounts of 0% (Control A), 0.1%, 0.3%, 2%, 5%, 10%, 20% and 30%, and (iii) 0.10% of cobalt metal (Co) as a cobalt napthenate solution in mineral spirits were prepared in the aforedescribed manner. A control (Control B) sample consisting of LDPE and the same amount of mineral spirits as was added above as solution, and a second control (Control C) sample consisting of LDPE and 10% polypropylene were also prepared. The aforesaid samples were fabricated into 20 mil plaques and weathered according to the aforementioned procedure.

The exposure time required for embrittlement, hereinafter also referred to as "Embr.", to occur is listed in Table I, Parts A and B, as well as the time required for the surface carbonyl level to exceed 1.7, hereinafter also referred to as "FMIR R > 1.7" and the ultimate elongation to fall below 20%, hereinafter also referred to as " ≤20% ELONG." The effect of the added polypropylene in Control C in promoting embrittlement is to reduce the exposure time required for embrittlement to occur as compared to Control B without polypropylene. The effect of the cobalt metal salt in Control A is to reduce the exposure time required for embrittlement over that necessay in Controls B or C without cobalt. The compositions comprising LDPE, PP, and cobalt naphthenate promotes embrittlement at a much faster rate than is observed for any of the controls. This embrittlement effect is also polypropylene concentration dependent, that is, the exposure time required for embrittlement to occur decreases as the polypropylene concentration increases. In all instances embrittlement of the aforesaid compositions proceeded faster than in Controls A, B or C.

Samples identical in every way with the above, but irradiated with a 5 megarep dose prior to weathering, demonstrated reduced exposure times for embrittlement to occur as the polypropylene concentration increased and required less exposure time to embrittle than the equivalent unirradiated samples; note Table I, Part A thereof, at polypropylene concentrations of 2% and higher. The exposure times for the irradiated samples are listed in Table I, Part B thereof. Other pertinent data are recorded in Table I below.

balt salts of a mixture of branched $C_8$ and $C_9$ acids in mineral spirits, known as cobalt Nuxtra. These compositions were fabricated into 20 mil plaques and weathered according to the aforementioned procedures. The exposure times required for embrittlement to occur, surface carbonyl level to exceed 1.7, and ultimate elongation to drop below 20% are listed in Part A of Table III below. All of the cobalt salt forms were active and promoted accelerated embrittlement in 200 hours exposure or less. The salts dispersed in mineral spirits show enhanced activity, with the naphthenate being the most active form in the 1.16% polypropylene compositions.

Ethylene polymer compositions identical to the above in every way, but containing 0.922 g/cc low density polyethylene base resin, 6.48% polypropylene as

TABLE I

| Samples: % by Weight | | | Exposure Times Required; Hours | | | | | |
|---|---|---|---|---|---|---|---|---|
| | | | PART A | | | PART B | | |
| LDPE | PP | Co | Embr. | FMIR R>1.7 | ≤20% ELONG. | Embr. | FMIR R>1.7 | ≤20% ELONG. |
| 70 | 30 | 0.10 | 60 | 60–150 | 20 | 20 | 60–150 | 0–20 |
| 80 | 20 | 0.10 | 20–60 | 60–150 | 20 | 20 | 60–150 | 0–20 |
| 90 | 10 | 0.10 | 60 | 60 | 60 | 20 | 20 | 0–20 |
| 95 | 5 | 0.10 | 100 | 60 | 100 | 60–100 | 20–60 | 60 |
| 98 | 2 | 0.10 | 150 | 60 | 150 | 100–150 | 20–60 | 100 |
| 99.6 | 0.3 | 0.10 | 150–250 | 60 | 150 | 150–250 | 20–60 | 100 |
| 99.8 | 0.1 | 0.10 | 150 | 60–150 | 150 | 60–250 | 60–100 | 60 |
| 100* | 0 | 0.10 | 250 | 60 | 150 | 250 | 20–60 | 150 |
| 100** | 0 | 0 | >1000 | >150 | >500 | 1000 | 150 | 500 |
| 90*** | 10 | 0 | 750 | 7500 | 500 | 500 | 500 | 500 |

\* Control A
\*\* Control B, contains an amount of mineral spirits equal to that present in all other samples.
\*\*\* Control C

EXAMPLE 2

Example 1 was repeated using cobalt octoate, in place of the cobalt naphthenate, at several varying concentrations. In all instances, the compositions contained two weight per cent polypropylene. The results are reported in Table II below, Parts A and B thereof.

the auto-oxidative susceptible additive, and 0.10% cobalt metal from each of the same cobalt salts were prepared. The exposure times required for the above phenomena to occur are listed in Part B of Table III below. All of the cobalt salt forms were active and promoted accelerated embrittlement in 200 hours exposure or

TABLE II

| Ethylene Polymer | | Exposure Times Required; Hours | | | | | |
|---|---|---|---|---|---|---|---|
| | | PART A | | | PART B | | |
| Composition, % | | | FMIR | | | FMIR | |
| LDPE | Co | Embr. | R>1.7 | ≤20% ELONG. | Embr. | R>1.7 | ≤20% ELONG. |
| 96 | 2 | 200–250 | 150 | 250 | 200–250 | 150 | 150–250 |
| 97 | 1 | 200 | 150 | 150–250 | 150–200 | 150 | 150–250 |
| 98 | 0.10 | 100–150 | 100–150 | 150 | 100–150 | 60 | 150 |
| 98 | 0.075 | 100–150 | 100–150 | 150 | 100–150 | 60 | 150 |
| 98 | 0.050 | 150 | 100–150 | 150 | 60–100 | 60 | 150 |
| 98 | 0.025 | 100–150 | 150 | 150 | 100–150 | 150 | 150 |
| 98 | 0.010 | 150 | 150–200 | 150–250 | 100 | 60 | 60–150 |

EXAMPLE 3

Compositions containing 98.8% of a 0.922 density LDPE, 1.16% polypropylene as the auto-oxidative susceptible additive (98% isotactic), and 0.05% of cobalt metal as the following salts: (1) solid cobalt acetate, (2) cobalt octoate solution in mineral spirits, (3) cobalt naphthenate solution in mineral spirits, and (4) the coless. The salts dispersed in mineral spirits show enhanced activity in the 6.48% polypropylene compositions. All of the octoate, naphthenate, or mixed branched $C_8$ and $C_9$ acid salts of cobalt show comparable effectiveness in causing accelerated embrittlement in combination with polypropylene in the preferred range of 1 to 6.5% in low density polyethylene.

TABLE III

PART A

| Co Salt | Embr. | Exposure Times Required, Hours FMIR R>1.7 | ≤20% ELONG. |
|---|---|---|---|
| Acetate | 200 | >150 | >150 |
| Octoate | 150–200 | 150 | 100–150 |
| Naphthenate | 150 | 100 | 100 |
| Nuxtra | 150–200 | 100 | 100–150 |

PART B

| Co Salt | Embr. | Exposure Time Required, Hours FMIR R>1.7 | ≤20% ELONG. |
|---|---|---|---|
| Acetate | 200 | >150 | >150 |
| Octoate | 100 | 150 | 60 |
| Naphthenate | 100 | 100 | 60–100 |
| Nuxtra | 150 | 150 | 60–100 |

EXAMPLE 4

A first composition containing 95% of a 0.928 density LDPE, 5% polypropylene as auto-oxidative susceptible additive (98% isotactic), and a mixture in mineral spirits of 0.05% cobalt metal as cobalt octoate and 0.05% iron metal as iron octoate, and a second composition containing 98% of a 0.928 density LDPE, 2% polypropylene (98% isotactic), and a mixture in mineral spirits of 0.025% cobalt octoate and 0.025% iron octoate, were prepared. Both of these compositions contained 0.05% antioxidant, 0.15% erucamide slip agent, and 0.15% silica anti-block agent. The compositions were pressed into 20 mils plaques, extruded into 20 mils sheet, and extruded into 2 mils film, all of which were weathered by the aforementioned procedure. After weathering for 60 hours, the surface carbonyl level of samples of both compositions fabricated as 20 mils plaques rose sharply. At 100 hours, a surface carbonyl level of 2.1 was achieved in samples of both compositions. Embrittlement was achieved by 100 hours exposure and the ultimate elongation dropped below 10% after 60 hours of weathering for samples of the first composition and after 100 hours of weathering for samples of the second composition.

The samples fabricated as extruded sheet were examined after weathering in 20 hours exposure intervals. The surface carbonyl level of both samples rose sharply in the interval between 40 and 60 hours of exposure, rising more rapidly for the first sample. The ultimate elongation dropped below 20% for the first composition after 60 hours exposure and for the second composition after 80 hours exposure. Embrittlement occurred after 80 hours exposure for the first composition and after 100 hours exposure for the second composition, and showed signs of splitting in the first composition after 500 hours exposure.

The samples fabricated as film developed a surface carbonyl level greater than 1.7 more slowly than did the other aforementioned specimens. This surface carbonyl level was obtained in the first composition after 100 hours exposure, and in the second composition after 150 hours of exposure. Embrittlement occurred in the film after 60 hours for the first composition and after 100 hours for the second composition. After 500 hours exposure both film samples had disintegrated and both sheet samples showed signs of failure and splitting along the surface cracks.

EXAMPLE 5

A composition containing 98% of a 0.922 density polyethylene (LDPE), 2% polypropylene (98% isotactic) as auto-oxidative susceptible additive; and 0.075% cobalt metal as a cobalt octoate solution in mineral spirits was prepared according to the procedure aforedescribed. Another composition as above was prepared additionally including a stabilizer system consisting of 0.05% Topanol CA,[1] and 0.15% dilauryl thiodipropionate. Control specimens (1) containing 2% polypropylene in the aforesaid LDPE and (2) neat LDPE, were also prepared. All of the aforementioned compositions were pressed into 20 mils plaques and weathered by the aforementioned procedures. All of the aforementioned compositions were pressed into 10 mil plaques for isothermal DSC induction time analyses at 180°C. according to the procedure as aforedescribed. The stabilized composition had an induction period of 14.1 minutes at 180°C. while the unstabilized composition had a 0.25 minute induction time at 180°C. The controls had induction times at 180°C. of 0.40 and 0.16 minute respectively.

[1] 1,1,3-Tris(5'-t-butyl-4'-hydroxy-2'-methylphenyl)-butane

The above compositions and controls were repeated, but irradiated with 5 megareps prior to testing. The isothermal DSC induction time for the irradiated stabilized composition was 4.4 minutes, the induction time for the irradiated unstabilized composition was 0.15 minute, and the induction times for the irradiated controls were 0.20 and 0.05 minute respectively.

Addition of the stabilizers in the combination of polyethylene, polypropylene, and cobalt salt was observed to provide stabilization against embrittlement in the highly active systems, which normally undergo oxidative embrittlement in either the presence or absence of weathering without the stabilizers. Subsequent irradiation of the compositions was observed to reduce the effectiveness of the stabilizers. After irradiation, the compositions embrittled either in the presence or absence of weathering by the procedure described.

EXAMPLES 6–29

In Examples 6–29 infra, samples of commercially available high molecular weight polymers were pressed or molded into plaques from which test specimens were cut. These specimens were tested for degradation by fungi using ASTM - D-1924-63[1]. This procedure requires the placement of test specimens in or on a solid agar growth medium that is deficient only in carbon. The medium and specimens are inoculated with the test microorganisms and incubated for 3 weeks. Any growth which may occur is dependent on the utilization of a component of the specimen as a carbon source by the test organism. The test fungi consisted of a mixture of Aspergillus niger, Aspergillus flavus, Chaetomium globosum, and Penicillium funiculosum. Since possible complication that growth may occur as a result of the presence of additives in the polymeric specimen, it was necessary that the polymeric specimen tested be free from stabilizers, plasticizers, lubricants, and other extraneous organic substances, or that the presence of such additives be recognized. If a pure polymeric specimen showed heavy growth and concurrent loss of weight and mechanical properties this was considered good evidence of its biodegradability.

[1] ASTM-D-1924: Recommended practice for determining resistance of synthetic polymeric materials to fungi. Ann. Book of ASTM Standards, 1970, Part 24, page 593.

After various exposure times up to 3 weeks, and longer, the samples were examined and assigned growth ratings as shown below:

Growth Ratings:
0 = No Growth
1 = Traces (Less than 10% Covered)
2 = Light Growth (10 to 30% Covered)
3 = Medium Growth (30 to 60% Covered)
4 = Heavy Growth (60 to 100% Covered)

The pertinent data are set out in Table IV below.

TABLE IV

| Sample No. | Commercial Thermoplastic | Growth Rating |
|---|---|---|
| 6 | Acrylonitrile/Butadiene/Styrene Terpolymer (ABS)[a] | 0 |
| 7 | Blend of ABS and Poly(Bisphenol A Carbonate)[b] | 0 |
| 8 | Butadiene/Acrylonitrile Rubber[c] | 0 |
| 9 | 72/Styrene/28 Acrylonitrile Copolymer | 0 |
| 10 | Poly(Methyl Methacrylate)[d] | 0 |
| 11 | Poly(Ethylene Terephthalate)[e] | 0 |
| 12 | Poly(Cyclohexanedimethanol Terephthalate)[f] | 0 |
| 13 | Poly(Bisphenol A Carbonate)[g] | 0 |
| 14 | Poly(4-Methyl-1-Pentene) | 0 |
| 15 | Polyisobutylene[h] | 0 |
| 16 | Chlorosulfonated Polyethylene[i] | 0 |
| 17 | Cellulose Acetate[j] | 0 |
| 18 | Cellulose Butyrate[k] | 0 |
| 19 | Nylon-6; Nylon-6/6; Nylon-12 | 0 |
| 20 | Poly(Vinyl Butyral) | 0 |
| 21 | Polyformaldehyde[l] | 0 |
| 22 | Poly(Vinyl Ethyl Ether); $I_r$=4 | 0 |
| 23 | Poly(Vinyl Acetate); $I_r$=0.8 | 1 |
| 24 | Poly(Vinyl Acetate), 50% Hydrolyzed to Poly(Vinyl Alcohol) | 1 |
| 25 | High Density Polyethylene, 31,600 M.W. | 0 |
| 26 | High Density Polyethylene, 52,500 M.W. | 0 |
| 27 | High Density Polyethylene, 97,300 M.W. | 1 |
| 28 | Low Density Polyethylene, 21,000 M.W. | 1 |
| 29 | Low Density Polyethylene, 28,000 M.W. | 0 |

[a] Kralastic K2938 by Uniroyal, Inc.
[b] Cycoloy by Borg Warner Corp.
[c] Hycar 1002 by B. F. Goodrich Co.
[d] Lucite by E. I. duPont de Nemours & Co.
[e] Arnite by Polychem AKU-GE, Holland
[f] Kodel by Eastman Kodak Co.
[g] Lexan 101 by General Electric Co.
[h] Vistanex by I. G. Farben
[i] Hypalon (29% Cl) by E. I. duPont de Nemours & Co.
[j] Tenite (036A371974B) by Eastman Kodak Co.
[k] Tenite (233A22300H2) by Eastman Kodak Co.
[l] Celcon by Celanese Corp.

EXAMPLES 30–35

Various polymers were tested for biodegradability in the manner indicated in Examples 6–29 supra. The results are documented in Table V below.

TABLE V

| Sample No. | Polymer | Reduced Viscosity | Growth Rating |
|---|---|---|---|
| 30 | Epsilon-Caprolactone Homopolymer | 0.7 | 4 |
| 31 | Epsilon-Caprolactone Homopolymer | 0.3 | 4 |
| 32 | Pivalolactone Homopolymer | 0.1 | 0 |
| 33 | Poly(Ethylene Terephthalate) | high | 0 |
| 34 | Poly(Cyclohexanedimethanol Terephthalate) | high | 0 |
| 35 | Thermoplastic Polyoxycaproyl Polyurethane[m] | high | 4 |

[m] Reaction of diethylene glycol initiated poly-(epsilon-caprolactone) diol of 2000 molecular weight with bis(4-isocyanatophenyl)methane using an NCO/OH ratio equal to one.

EXAMPLES 36–39

Four normally-solid thermoplastic oxycaproyl graft polymers prepared by reacting epsilon-caprolactone with styrene/2-hydroxyethyl methacrylate copolymer were tested for biodegradability in the manner set out in Examples 6–29 supra. The results are recorded in Table VI below.

TABLE VI

| Example No. | Graft Polymer[a] | Reduced Viscosity | Growth Rating |
|---|---|---|---|
| 36 | 22.5 S/0.5 HM/77 CL | 0.7 | 4 |
| 37 | 67 S/1.0 HM/32 CL | 0.9 | 4 |
| 38 | 78 S/1.0 HM/21 CL | 0.8 | 2 |
| 39 | 89 S/3.0 HM/8 CL | 0.6 | 1 |

[a] The notation S/HM/CL for the graft polymer represents styrene/2-hydroxyethyl methacrylate/epsilon-caprolactone.

EXAMPLES 40–41

Two normally-solid thermoplastic oxycaproyl graft polymers prepared by reacting epsilon-caprolactone with hydrolyzed ethylene/vinyl acetate copolymer were tested for biodegradability in the manner set out in Examples 6–29 supra. The results are noted in Table VII below.

TABLE VII

| Example No. | Graft Polymer | Growth Rating |
|---|---|---|
| 40 | 18 Ethylene/6 Vinyl Alcohol/76 CL[1] | 4 |
| 41 | 36 Ethylene/12 Vinyl Alcohol/52 CL[1] | 4 |

[1] "CL" represents epsilon-caprolactone.

EXAMPLES 42–51

Several relatively low molecular weight thermoplastic copolymers of ethylene and different vegetable oils were tested for biodegradability in the manner set out in Examples 6–29 supra. These copolymers were carefully purified before testing to remove unreacted vegetable oil. The pertinent data are noted in Table VIII below.

TABLE VIII

| Sample No. | Ethylene/Vegetable Oil Copolymer | Growth Rating |
|---|---|---|
| 42 | 74 Ethylene/26 Castor Oil | 0 |
| 43 | 72 Ethylene/28 Linseed Oil | 0 |
| 44 | 73 Ethylene/27 Safflower Oil | 0 |
| 45 | 73 Ethylene/27 Soybean Oil | 0 |
| 46 | 59 Ethylene/41 Neat Foot Oil | 0 |
| 47 | 80 Ethylene/20 Peanut Oil | 0 |
| 48 | 81 Ethylene/19 Rapeseed Oil | 0 |
| 49 | 84 Ethylene/16 Olive Oil | 0 |
| 50 | 82 Ethylene/18 Corn Oil | 0 |
| 51 | 91 Ethylene/9 Oleic Acid | 0 |

EXAMPLES 52–53

Poly(beta-propiolactone) and poly(delta-valerolactone) were tested for biodegradability in the manner indicated in Examples 6–29 supra. The results are noted in Table IX below.

of 2 inches per minute to obtain the stress-strain curve. The pertinent data are shown in Table X below.

TABLE X

| Sample No. | Polymer | Growth Rating | Modulus, psi | Tensile Strength, psi | Elongation at Break, % |
|---|---|---|---|---|---|
| 54 | Delta-Valerolactone Homopolymer | 4 | 67,000 | 1,400 | 3.0 |
| 55 | Beta-Propiolactone Homopolymer | 4 | 161,000 | 1,000 | 0.6 |

TABLE IX

| Sample No. | Polymer | Reduced Viscosity | Growth Rating[a] |
|---|---|---|---|
| 52 | Beta-Propiolactone Homopolymer | 1.36[b] | 4 |
| 53 | Delta-Valerolactone Homopolymer | 0.48 | 4 |

[a] Determined in accordance with ASTM Method D-1924-63.
[b] Determined 0.2 gram/100cc chloroform.

EXAMPLES 54–55

Thermoplastic beta-propiolactone homopolymer ($I_r$ of 1.36; 0.2 gm/100cc. of chloroform) and delta-valerolactone homopolymer ($I_r$ of 0.48) are tested for biodegradability (ASTM Method D-1924-63). The physical properties of the tested samples are measured by a modified ASTM D882-67 (Method A) procedure using an Instron Tensile Tester. In this modification a 1 inch specimen is used and stretched at a rate of 0.2 inch per minute to a 1 percent stretch to obtain the modulus; the same specimen is then stretched at a rate

EXAMPLES 56–73

In Examples 56–73, various blends of biodegradable thermoplastic polymer and environmentally degradable ethylene polymers were formed by fluxing on a two-roll mill. Plaques measuring about 6 × 6 × 0.04 inches from the blends were then formed via compression molding techniques. Strips measuring approximately 1 × 2 × 0.04 inches were cut from the plaques. The strips made from the blends set out in Examples 56–67 were exposed to a source of UV light for 8 hours using a sun lamp, 4 inch distance, 40 watt intensity. The strips made from the blends of Examples 68–73 were not so exposed. Within one day the strips were buried in a mixture of equal parts of New Jersey garden soil, Michigan peat moss, and builders sand. After 3 months the strips were removed. Visual examination of these strips revealed substantial crazing, biodegradation and disintegration. The pertinent data are noted in Table XI below:

TABLE XI

| EXAMPLE NO. | COMPOSITION OF BLEND | COMPOSITION OF EDEP[1] Wt% | GROWTH RATING[2] |
|---|---|---|---|
| 56 | 90 PCL[3]/10 EDEP | 97.5 LDPE[6]<br>2.0 PP[8]<br>0.05 Co[9]<br>0.05 AO-1010[11] | 4 |
| 57 | 80 PCL/20 EDEP | 99.0 LDPE<br>0.5 PP<br>0.05 Co<br>0.05 AO-1010 | 4 |
| 58 | 70 PCL/30 EDEP | 94.6 HDPE[7]<br>5.0 PP<br>0.025 Co<br>0.15 AO-1076[12] | 4 |
| 59 | 60 PCL/40 EDEP | 89.6 LDPE<br>10.0 PP<br>0.03 FE[10]<br>0.1 SANT R[13] | 4 |
| 60 | 80 PPL[4]/20 EDEP | 83.7 LDPE<br>15.0 PP<br>0.1 Co<br>0.3 SANT R | 4 |
| 61 | 70 PCL/30 EDEP | 87.5 LDPE<br>10.0 PP<br>0.1 Co<br>0.1 Fe<br>0.5 Ionol[15] | 4 |
| 62 | 40 PCL/60 EDEP | 83.9 LDPE<br>15.0 PP<br>.1 Co<br>.1 Top CA[14] | 4 |
| 63 | 80 PPL/20 EDEP | 98.7 LDPE<br>1.0 PP<br>0.025 Co<br>0.05 SANT R | 4 |

TABLE XI—Continued

| EXAMPLE NO. | COMPOSITION OF BLEND | COMPOSITION OF EDEP[1] Wt% | GROWTH RATING[2] |
|---|---|---|---|
| 64 | 70 PPL/30 EDEP | 93.5 HDPE<br>5.0 PP<br>0.05 Fe<br>0.05 Co<br>0.5 Ionol | 4 |
| 65 | 50 PPL/50 EDEP | 89.1 LDPE<br>10.0 PP<br>0.03 Fe<br>0.6 Ionol | 4 |
| 66 | 90 PDL[5]/10 EDEP | 99.2 LDPE<br>0.5 PEG-6000[18]<br>0.025 Co.<br>0.05 AO-1010 | 4 |
| 67 | 80 PDL/20 EDEP | 99.0 EVA[17]<br>0.5 PP<br>0.05 Co<br>0.05 AO-1010 | 4 |
| 68 | 70 PCL/30 EDEP | 94.5 HDPE<br>5.0 PP<br>0.05 Co | 4 |
| 69 | 60 PCL/40 EDEP | 89.5 LDPE<br>10.0 PP<br>0.05 Fe | 4 |
| 70 | 70 PCL/30 EDEP | 99.0 EAA[16]<br>0.1 Co | 4 |
| 71 | 70 PCL/30 EDEP | 99.5 EVA<br>0.05 Co | 4 |
| 72 | 70 PPL/30 EDEP | 94.5 HDPE<br>5.0 PP | 4 |
| 73 | 60 PCL/40 EDEP | 89.0 LDPE<br>10.0 PP<br>0.1 Fe | 4 |

Footnotes to Table XI

| | | |
|---|---|---|
| (1) | EDEP | represents environmentally degradable ethylene polymer |
| (2) | | Determined in accordance with ASTM Method D-1924-63 |
| (3) | PCL | represents epsilon-caprolactone homopolymer; $I_r$ of 0.7 |
| (4) | PPL | represents beta-propiolactone homopolymer; $I_r$ of 1.4 |
| (5) | PDL | represents delta-valerolactone homopolymer; $I_r$ of 0.6 |
| (6) | LDPE | represents low density polyethylene (0.922) |
| (7) | HDPE | represents high density polyethylene (0.962) |
| (8) | PP | represents polypropylene (98 weight percent isotactic) |
| (9) | Co | represents % cobalt in the form of cobalt octanoate in mineral spirits |
| (10) | Fe | represents iron in the form of iron octanoate in mineral spirits (10% metal) |
| (11) | AO-1010 | represents tetrakis[methylene-3-(3'-5'-di-t-butyl-4-hydroxyphenyl)-propionate]methane |
| (12) | AO-1076 | represents stearyl 3-(3'-5'-di-t-butyl-4'-hydroxyphenyl)-propionate |
| (13) | SANT R | represents 4,4'-thiobis(3-methyl-6-t-butylphenol) |
| (14) | Top CA | represents 1,1,3-tris(5'-t-butyl-4'-hydroxy-2'-methylphenyl)butane |
| (15) | Ionol | represents 2,6-di-t-butyl-p-cresol |
| (16) | EAA | represents thermoplastic 98 ethylene/2 acrylic acid copolymer |
| (17) | EVA | represents thermoplastic 90 ethylene/10 vinyl acetate copolymer |
| (18) | PEG-6000 | represents polyethylene glycol, average molecular weight of about 6,000 |

EXAMPLE 74

The blends set out in Examples 56–73 supra are molded into containers designed in the shape of a "bullet" measuring approximately 5 inches in length and 1 inch in outside diameter (maximum for bullet). The wall of the bullet is about one-sixteenth inch in thickness and is weakened by a slit 1/16-inch wide that extends longitudinally from the rim to a hole near the point of the bullet. The hole is about ¼-inch wide and about ½-inch long. The environmentally degradable ethylene polymer component of the blends described in Examples 56–67 are exposed to the UV light source as indicated previously; the environmentally degradable component of Examples 68–73 are not. The containers are filled with a mixture containing equal parts of graden soil, Michigan peat moss, and builders sand, and seeded with Douglas Fir. Within the confines of a greenhouse, the containers are then inserted into garden soil enriched with plant nutrients and conditioners. The watering schedule is predetermined and takes into consideration the container size, climate, and tree species. After periods of 6 months and 12 months, normal root structure and normal growth of the tree seedlings are observed. Visual examination shows a high degree of disintegration of the bullets.

EXAMPLES 75–78

In Examples 75–78, various blends of biodegradable thermoplastic polymers, environmentally degradable ethylene polymers and additional ingredients or additives are formed by fluxing on a two-roll mill. Molded articles in the shape of small flower pots are then molded from the blends.

The articles made from the blends set out in Examples 75–77 are exposed to a source of UV light for 8 hours using a sun lamp, four inch distance, 40 watt intensity. The article made from the blend of Example 78 is not so exposed. Within one day the pots are buried in a mixture of equal parts of New Jersey garden soil, Michigan peat moss, and builders sand. After 3 months the pots are removed. Visual examination of these pots reveals substantial crazing, biodegradation, and disintegration. The pertinent data are noted in Table XII below:

TABLE XII

| EXAMPLE NO. | COMPOSITION OF BLEND | COMPOSITION OF EDEP[1]; Wt % | GROWTH RATING[2] |
|---|---|---|---|
| 75 | 80 PGL[3]/10 EDEP/ 10 ASBESTOS | 97.8 LDPE[4] <br> 2.0 PP[6] <br> 0.15 Co[7] <br> 0.05 AO-1010[9] | 4 |
| 76 | 70 PCL/20 EDEP/ 10 RICE HULLS | 99.0 LDPE <br> 0.45 PP <br> 0.5 Co <br> 0.05 AO-1010 | 4 |
| 77 | 50PCL/30 EDEP/ 20 RECLAIMED BUTADIENE-STYRENE RUBBER | 95.0 HDPE[5] <br> 4.7 PP <br> 0.25 Co <br> 0.05 AO-1076hu (10) | 4 |
| 78 | 50 PCL/25 EDEP/25 PEO | 99.7 LDPE <br> 0.3 Fe[8] | 4 |

Footnotes to Table XII
[1] EDEP represents enviromentally degradable ethylene polymer.
[2] Determined in accordance with ASTM Method D-1924-63.
[3] PCL represents epsilon-caprolactone homopolymer; I, of 0.7.
[4] LDPE represents low density polyethylene (0.922).
[5] HDPE represents high density polyethylene (0.962).
[6] PP represents polypropylene (98 weight percent isotactic).
[7] Co represents cobalt in the form of cobalt octoate in mineral spirits.
[8] Fe represents iron in the form of iron octoate in mineral spirits.
[9] AO-1010 represents tetrakis[methylene-3-(3',5'-di-t-butyl-4'-hydroxyphenyl)propionate]methane.
[10] AO-1076 represents stearyl 3-(3',5'-di-t-butyl-4'-hydroxyphenyl)propionate.

We claim:
1. A biodegradable-environmentally degradable blend comprising
i. from about 5 to about 95 weight per cent of biodegradable thermoplastic polymer, said polymer having a reduced viscosity value of at least about 0.1 and upwards to about 12 and being further characterized in that at least about 10 weight per cent of said biodegradable thermoplastic polymer is attributable to recurring oxyalkanoyl units of the formula

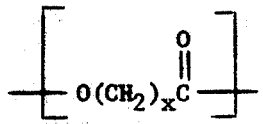

wherein $x$ is an integer having a value of 2 to 7, with the proviso that $x$ does not equal 3; and
ii. from about 95 to about 5 weight per cent of an environmentally degradable ethylene polymer based composition comprised of
A. at least about 70 weight per cent of normally-solid thermoplastic ethylene polymers of the group consisting of (a) polyethylene, (b) copolymers containing a major amount by weight of ethylene and a minor amount by weight of unsaturated monomers copolymerizable therewith, and (c) mixtures thereof, and
B. at least one polyvalent transition metal salt in which said metal has an atomic number of from 21 to 30, 39 to 48, and 57 to 71.

2. The biodegradable-environmentally degradable blend of claim 1 wherein said biodegradable thermoplastic polymer is characterized by at least 10 weight percent of recurring oxycaproyl units of the formula

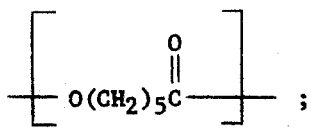

and wherein said normally-solid thermoplastic ethylene polymer is polyethylene.

3. The biodegradable-environmentally degradable blend of claim 2 wherein said biodegradable thermoplastic polymer has a reduced viscosity value of from about 0.2 to about 8 and is further characterized in that at least about 20 weight percent of said polymer is attributable to recurring oxycaproyl units.

4. The biodegradable-environmentally degradable blend of claim 3 wherein at least about 50 weight percent of said biodegradable thermoplastic polymer is attributable to recurring oxycaproyl units.

5. The biodegradable-environmentally degradable blend of claim 4 wherein at least about 70 to about 100 weight percent of said biodegradable thermoplastic polymer is attributable to recurring oxycaproyl units.

6. The biodegradable-environmentally degradable blend of claim 1 comprising from about 10 to about 90 weight percent of said biodegradable thermoplastic polymer characterized by at least 50 weight percent of recurring oxycaproyl units of the formula

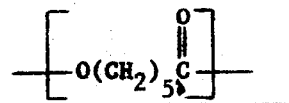

and from about 90 to about 10 weight percent of said environmentally degradable ethylene polymer based composition.

7. The biodegradable-environmentally degradable blend of claim 6 wherein said normally-solid thermoplastic ethylene polymer is polyethylene.

8. The biodegradable-environmentally degradable blend of claim 1 wherein said environmentally degradable ethylene polymer based composition contains an antioxidant.

9. The biodegradable-environmentally degradable blend of claim 8 wherein said environmentally degradable ethylene polymer based composition contains therein an auto-oxidative susceptible additive having at least one hydrogen atom bonded to a carbon atom having an auto-oxidative susceptibility greater than that of a hydrogen atom bonded to a normal secondary carbon atom.

10. Biodegradable-environmentally degradable articles of manufacture from the blend claimed in claim 1.

11. Biodegradable-environmentally degradable articles of manufacture from the blend claimed in claim 2.

12. Biodegradable-environmentally degradable articles of manufacture from the blend claimed in claim 4.

13. Biodegradable-environmentally degradable articles of manufacture from the blend claimed in claim 5.

14. Biodegradable-environmentally degradable articles of manufacture from the blend claimed in claim 7.

15. The biodegradable-environmentally degradable articles of manufacture of claim 12 in the form of a container.

16. The biodegradable-environmentally degradable articles of manufacture of claim 12 in the form of a film.

17. The biodegradable-environmentally degradable articles of manufacture of claim 12 in the form of packaging material.

18. A biodegradable-environmentally degradable blend as in claim 9 in which said auto-oxidative susceptible additive is polypropylene.

19. A biodegradable-environmentally degradable blend as in claim 1 in which said polyvalent transition metal salt comprises a salt of cobalt.

20. A biodegradable-environmentally degradable blend as in claim 1 in which said polyvalent transition metal salt comprises a salt of iron.

21. A biodegradable-environmentally degradable blend as in claim 19 in which said polyvalent transition metal salt comprises a salt of iron.

22. A biodegradable-environmentally degradable blend as in claim 1 wherein said environmentally degradable ethylene polymer based composition contains therein an auto-oxidative susceptible additive having at least one hydrogen atom bonded to a carbon atom having an auto-oxidative susceptibility greater than that of a hydrogen atom bonded to a normal secondary carbon atom.

23. A biodegradable-environmentally degradable blend as in claim 22 in which said auto-oxidative susceptible additive is polypropylene.

24. A biodegradable-environmentally degradable blend as in claim 22 in which said polyvalent transition metal salt comprises a salt of cobalt.

25. A biodegradable-environmentally degradable blend as in claim 22 in which said polyvalent transition metal salt comprises a salt of iron.

26. A biodegradable-environmentally degradable blend as in claim 24 in which said polyvalent transition metal salt comprises a salt of iron.

27. A biodegradable-environmentally degradable blend as in claim 8 in which said polyvalent transition metal salt comprises a salt of cobalt.

28. A biodegradable-environmentally degradable blend as in claim 8 in which said polyvalent transition metal salt comprises a salt of iron.

29. A biodegradable-environmentally degradable blend as in claim 27 in which said polyvalent transition metal salt comprises a salt of iron.

30. A biodegradable-environmentally degradable blend as in claim 1 comprising
   i. from about 25 to about 75 weight percent of said biodegradable thermoplastic polymer, and
   ii. from about 25 to about 75 weight percent of said environmentally degradable ethylene polymer based composition.

31. The biodegradable-environmentally degradable blend of claim 1 wherein said biodegradable thermoplastic polymer is characterized by at least 10 weight percent of recurring oxycaproyl units of the formula

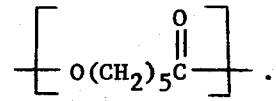

32. The biodegradable-environmentally degradable articles of manufacture of claim 10 in the form of a container.

* * * * *